United States Patent [19]
Mahoney

[11] Patent Number: 5,715,293
[45] Date of Patent: Feb. 3, 1998

[54] METHOD AND APPARATUS FOR MONITORING TELECOMMUNICATION SIGNALS

[76] Inventor: Michael Lawrence Mahoney, 2524 N. 4th St., Blue Springs, Mo. 64015

[21] Appl. No.: 654,472

[22] Filed: May 28, 1996

[51] Int. Cl.⁶ .............................. H04M 1/24; H04M 3/08; H04M 3/22; H04M 7/00
[52] U.S. Cl. .................. 379/23; 379/9; 379/34; 379/230; 370/247; 370/252
[58] Field of Search ................ 379/1, 27, 9–15, 379/22–30, 34–35, 111, 112, 113, 219, 220, 229, 230; 370/244, 247, 250, 251, 252, 253; 375/224, 225, 228; 371/20.1

[56] References Cited
U.S. PATENT DOCUMENTS

| | | |
|---|---|---|
| 5,457,729 | 10/1995 | Hamann et al. ........................ 379/2 |
| 5,521,902 | 5/1996 | Ferguson ........................ 379/1 |
| 5,592,530 | 1/1997 | Brockman et al. ........................ 379/10 |

*Primary Examiner*—Curtis Kuntz
*Assistant Examiner*—Paul Loomis
*Attorney, Agent, or Firm*—Harley R. Ball; Michael J. Setter; Jed W. Caven

[57] ABSTRACT

A method and apparatus for monitoring telecommunication signals carried by a telecommunication network (10) including a signal transfer point device (12) for routing data, clock and control signals over a link (14) and a link monitor (16) operable for monitoring the link (14) is disclosed. The method and apparatus provides for the monitoring of the data and clock signals routed over the link (14) without tapping into the control signals routed over the link (14).

12 Claims, 2 Drawing Sheets

METHOD AND APPARATUS FOR MONITORING TELECOMMUNICATION SIGNALS

BACKGROUND OF THE INVENTION

1. Field of the Invention

The present invention relates to telecommunication networks including signal transfer point devices for routing data signals, clock signals and control signals over telecommunications links. More particularly, the invention relates to a method and apparatus for monitoring the data and clock signals routed over a telecommunications link with a link monitor by tapping into the data and clock signals carried by the link without tapping into the control signals carried by the link.

2. Description of the Prior Art

Telecommunications networks establish communication paths between two or more elements or points in the networks by signaling between the elements or points. Telecommunication signaling enables the network to transfer other non-signaling information. One well known telecommunications signaling system is Signaling System #7 (SS7).

Telecommunication networks typically include numerous signal transfer point devices for routing the telecommunication signaling over the network. The signal transfer point devices are coupled together by a telecommunication link including a plurality of link lines. The telecommunication signaling typically includes data signals, clock signals and control signals.

Link monitors are often used to monitor the signaling between a signal transfer point and other elements of the network to monitor the status of the network. For example, link monitors can be used to monitor the status of various links in a region of the telecommunication network, monitor the telecommunication traffic over the network, analyze protocol information, and trace calls routed over the network.

To enable a link monitor to monitor the status of a link it must first be coupled with the link. One prior art method of coupling a link monitor to a link involves splicing a plurality of wires into the link lines and routing the spliced-in wires to the link monitor. Those skilled in the art will appreciate that this method is time consuming and difficult because the link lines carrying the data signals and clock signals must first be identified and separated from the link lines carrying the control signals since only the data and clock signals are monitored by the link monitor. Then, the link lines carrying the data and clock signals must be cut or spliced. This splicing method often degrades the signals carried by the link because of the interruption of the conductors in the link lines.

Data taps for permitting tapping into telecommunication network links without splicing the links are known in the art. However, all known telecommunication network data taps are "straight-through" or "Y-type" devices that tap into the control signals as well as the data and clock signals. This is a problem, because as discussed above, link monitors only monitor the data signal and clock signals routed over the telecommunication link.

Since prior art telecommunication data taps tap into the control signals as well as the data and clock signals, the unwanted control signals must either be wired all the way to the link monitor or left unterminated at the data tap. Neither of these options is desirable because wiring the control signals all the way to the link monitor requires additional, unneeded wiring that increases the cost of link monitoring, especially when the link monitor is located remotely from the link. Additionally, leaving the tapped control signals unterminated at the data tap results in an unbalanced system that may degrade or interfere with the transfer of the signals over the link.

Accordingly, there is a need for an improved method and apparatus for monitoring the data and clock signals routed over a telecommunication link. More particularly, there is a need for an improved method and apparatus that separates the link lines carrying the data and clock signals from the link lines carrying the control signals and that taps into only the data and clock signals and prevents tapping into the control signals.

SUMMARY OF THE INVENTION

The present invention solves the above-described problems with the prior art and provides a distinct advance in the state of the art. More particularly, the present invention provides a method and apparatus for monitoring a link in a telecommunications network that separates the link lines carrying the data and clock signals from the link lines carrying the control signals, taps into only the data and clock signals and prevents tapping into the control signals.

The method of the present invention is preferably used with a telecommunications network including at least one signal transfer point device for routing data, clock and control signals over a link and a link monitor operable for monitoring the status of the link. The method broadly includes the steps of interposing a data tap between the signal transfer point device and the link, and using the data tap to deliver the data, clock and control signals from the signal transfer point device to the link, tap into the data and clock signals, deliver the tapped data and clock signals to the link monitor, separate the control signals from the data and clock signals, and prevent tapping into the control signals.

The present invention also includes a data tap for performing the above-described method steps. The data tap broadly includes an input connector, an output connector and a tap connector. The input connector is operable for coupling with a corresponding connector coupled with the signal transfer point device for receiving the data, clock and control signals from the signal transfer point device. The output connector is operable for coupling with a corresponding connector coupled with the link. The input connector and output connector are electrically connected so that the data, clock and control signals received by the input connector are routed straight through to the output connector and the link.

The tap connector is operable for coupling with a corresponding connector coupled with the link monitor. The tap connector is electrically coupled with the pins of the input connector that carry the data signals and the clock signals but is electrically isolated from the pins that carry the control signals. With this construction, the data tap provide means for tapping into the data and clock signals carried by the link, means for delivering the tapped data and clock signals from the data tap to the link monitor, and means for separating the control signals from the data and clock signals for preventing tapping into the control signals.

By providing a method and apparatus as described above, numerous advantages are realized. For example, by providing a method and apparatus for monitoring a telecommunication link by tapping into the telecommunication signals carried by the link, the link can be monitored without splicing into the link lines.

Additionally, by providing a method and apparatus that separates the control signals from the data and clock signals, that taps into only the data and clock signals and that prevents tapping into the control signals, a link monitor can be coupled with a link without carrying the control signals all the way to the link monitor and without leaving the control signals unterminated at a straight-through or Y-type data tap.

BRIEF DESCRIPTION OF THE DRAWING FIGURES

A preferred embodiment of the present invention is described in detail below with reference to the attached drawing figures, wherein:

FIG. 1 is a block diagram illustrating the coupling of a link monitor with a link of a telecommunication network; and FIG. 2 is a schematic diagram of a data tap constructed in accordance with a preferred embodiment of the invention for coupling the link monitor with the link of the telecommunication network.

DETAILED DESCRIPTION OF THE PREFERRED EMBODIMENTS

Figure 1:
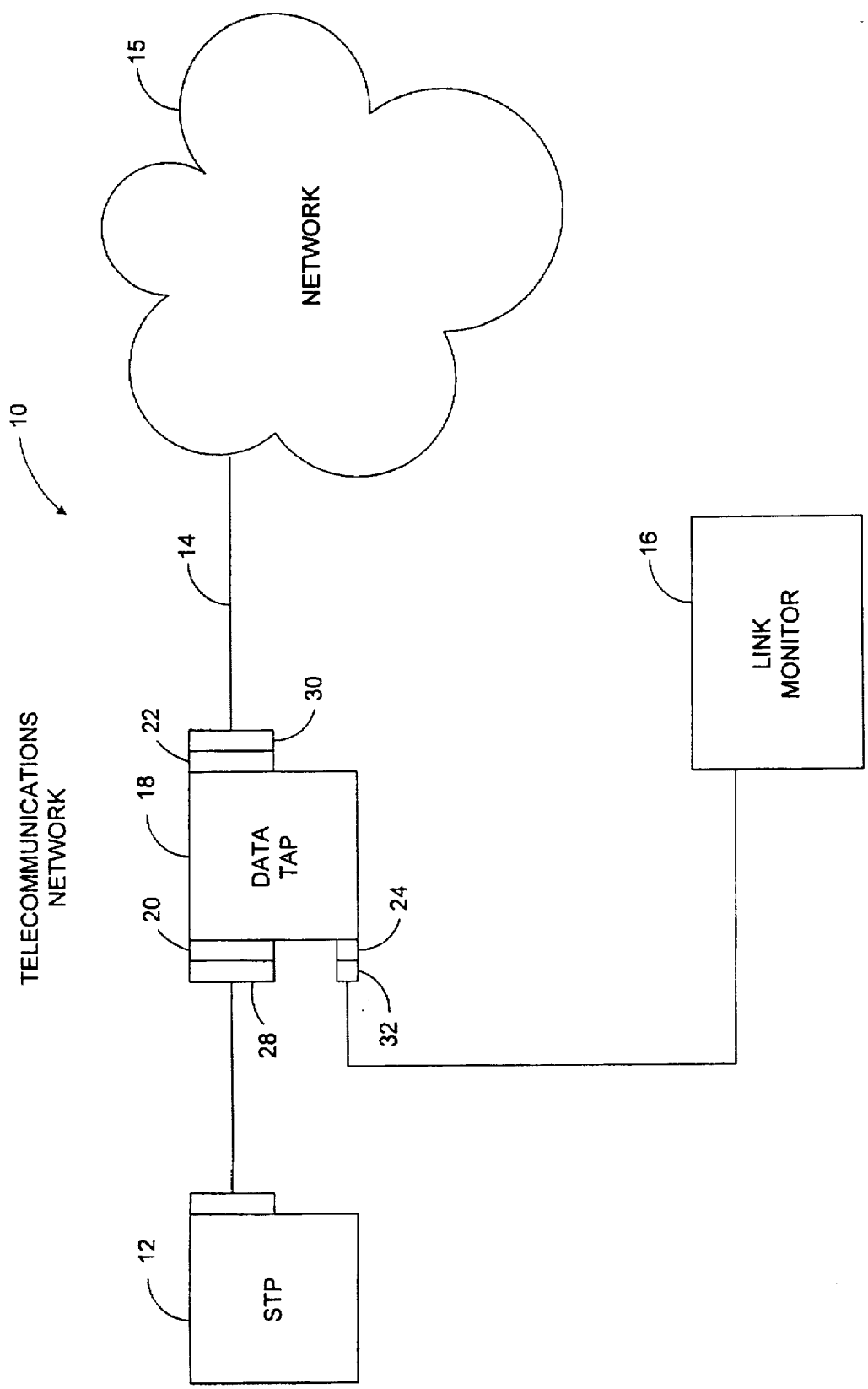
Figure 2:
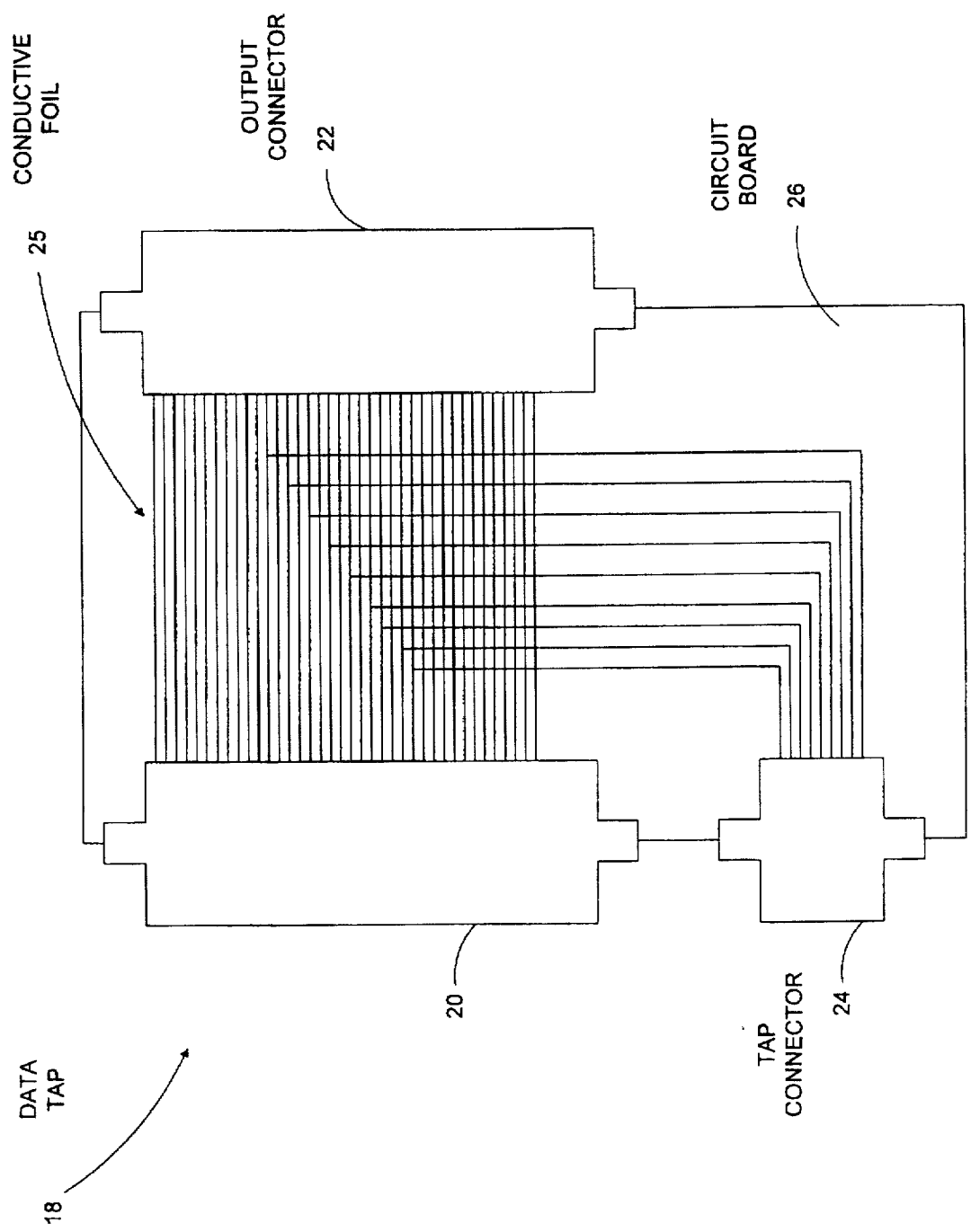

FIG. 1 illustrates a telecommunication network 10 including a signal transfer point device 12 for routing data, clock and control signals over a link 14 to other components 15 of the network and a link monitor 16 for monitoring the status of the link 14. FIG. 2 illustrates a data tap 18 constructed in accordance with a preferred embodiment of the invention for coupling the link monitor 16 with the link 14. Those skilled in the art will appreciate that the other components 15 of the network may include other signal transfer points or switches.

The signal transfer point device 12 may be any conventional signaling device such as a signaling switch manufactured by the Digital Corporation. The link monitor 16 may be any signaling monitoring system such as the Model No. HP E4250A monitoring system manufactured by the Hewlett Packard Corporation. The link 14 preferably includes a plurality of multi-bit lines for routing data signals, clock signals, and control signals from the signal transfer point device 12 to the other components 15 of the network.

As illustrated in FIG. 2, the preferred data tap 18 broadly includes an input connector 20, an output connector 22, and a tap connector 24. The connectors 20, 22, 24 may be any conventional type telecommunication connectors such as RS-232, RS-449, RS-530, or V.35 connectors and are preferably mounted to a conventional circuit board 26 and enclosed within a metal casing. The circuit board 26 and casing are preferably grounded to some element in the network such as the signal transfer point device 12.

The input connector 20 is operable for coupling with a corresponding connector 28 that is connected to the portion of the link 14 coupled with the signal transfer point device 12. The input connector includes a plurality of data pins for receiving data signals from the signal transport point device 12, a plurality of clock pins for receiving clock signals from the signal transfer point device 12, and a plurality of control pins for receiving control signals from the signal transfer point device 12. In one embodiment of the invention, the input connector 20 is an RS-449 type connector and includes 37 pins.

The output connector 22 is operable for coupling with a corresponding connector 30 that is connected to the portion of the link coupled with the other components 15 of the network. The output connector includes a plurality of data pins for routing data signals received from the input connector to the link 14, a plurality of clock pins for routing clock signals received from the input connector to the link 14, and a plurality of control pins for routing control signals received from the input connector to the link 14. In one specific embodiment of the invention, the output connector 22 is an RS-449 type connector and includes 37 pins.

The pins of the input connector 20 are electrically coupled with the pins of the output connector 22 by conventional means such as conductive foil 25 so that the data, clock and control signals received by the input connector 20 are routed directly to the output connector 22. Thus, when the data tap 18 is interposed in the link 14, it passes or routes the data, clock and control signals from the input connector 20 straight through to the output connector 22 so that the data tap 18 is transparent to the network.

The tap connector 24 is operable for coupling with a corresponding connector 32 that is electrically connected with the link monitor 16. The tap connector 24 includes a plurality of data pins for routing data signals tapped from the link 14 to the link monitor 16 and a plurality of clock pins for routing clock signals tapped from the link 14 to the link monitor 16. In one specific embodiment of the invention, the output connector 22 includes 9 pins.

The pins of the tap connector 24 are electrically coupled with only those pins of the input connector 20 that carry data signals and clock signals. The data tap 24 separates the conductors carrying the data signals and clock signals from the conductors carrying the control signals so that the data signals and clock signals can be tapped into without tapping into the control signals.

With this construction, the data tap 18 provides means for tapping into the data and clock signals carried by the link 14, means for delivering the tapped data and clock signals from the data tap 18 to the link monitor 16, and means for separating the control signals from the data and clock signals for preventing tapping into the control signals.

To monitor the status of the link 14, the data tap 18 is first interposed in the link 14 by coupling the input connector 20 to the corresponding connector 28, the output connector 22 to the corresponding connector 30, and the tap connector 24 to the corresponding connector 32 as illustrated in FIG. 1.

Once interposed in the link 14, the data tap 18 serves three primary functions. First, it routes or passes the data signals, clock signals and control signals from the signal transfer point device 12 straight through to the other components 15 of the network. Thus, the data tap 18 and the link monitor 16 are transparent to the network.

Second, the data tap 18 taps into the data and clock signals routed over the link 14 and delivers these tapped data and clock signals to the link monitor 16 for use in monitoring the status of the link 14 and the network. Third, the data tap 18 separates the control signals from the data and clock signals so that only the data and clock signals are tapped. This prevents the tapping of the control signals and thus allows the link monitor 16 to be coupled with the link 14 without carrying the control signals all the way to the link monitor 16 and without leaving the control signals unterminated at a straight-through or Y-type data tap.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. In a telecommunications network including a signal transfer point device for routing data, clock and control signals over a link and a link monitor operable for monitoring said link, a method of monitoring said data and clock signals routed over said link, said method comprising the steps of:

interposing a data tap between said signal transfer point device and said link; and using said data tap to deliver said data, clock and control signals from said signal transfer point device to said link;

said using step further including the steps of tapping into said data and clock signals, delivering said tapped data and clock signals to said link monitor and separating said control signals from said data and clock signals for preventing tapping into said control signals.

2. The method as set forth in claim 1, said data tap including an input connector operable for coupling with a corresponding connector coupled with said signal transfer point device for receiving said data, clock and control signals from said signal transfer point device;

an output connector operable for coupling with a corresponding connector coupled with said link;

means for electrically coupling said input connector with said output connector for delivering said data, clock and control signals from said input connector to said output connector and said link;

a tap connector operable for coupling with a corresponding connector coupled with said link monitor; and means for tapping into said coupling means for tapping said data and clock signals from said input connector to said tap connector for delivery to said link monitor and for preventing tapping into said control signals.

3. The method as set forth in claim 2, further including the steps of coupling said input connector with said corresponding connector coupled with said signal transfer point device, coupling said output connector with said corresponding connector coupled with said link, and coupling said tap connector with said corresponding connector coupled with said link monitor for delivering only said data and clock signals to said link monitor and for preventing delivery of said control signals to said link monitor.

4. The method as set forth in claim 3, said link including a plurality of data, clock and control link lines for routing said data, clock and control signals, respectively.

5. The method as set forth in claim 4, said input connector including a plurality of data pins adapted for coupling with said data link lines, a plurality of clock pins adapted for coupling with said dock link lines, and a plurality of control pins adapted for coupling with said control link lines.

6. The method as set forth in claim 5, said output connector including a plurality of data pins coupled with said input connector data pins, a plurality of clock pins coupled with said input connector clock pins, and a plurality of control pins coupled with said input connector control pins.

7. The method as set forth in claim 6, said tap connector including a plurality of data pins coupled with said input connector data pins and a plurality of clock pins coupled with said input connector clock pins.

8. In a telecommunications network including a signal transfer point device for routing data, clock and control signals over a link and a link monitor operable for monitoring said link, a data tap for coupling said link monitor with said link for permitting monitoring of said link, said data tap comprising:

an input connector operable for coupling with a corresponding connector coupled with said signal transfer point device for receiving said data, clock and control signals from said signal transfer point device;

an output connector operable for coupling with a corresponding connector coupled with said link;

means for coupling said input connector with said output connector for delivering said data, clock and control signals from said input connector to said output connector and said link;

a tap connector operable for coupling with a corresponding connector coupled with said link monitor; and means for tapping into said coupling means, said tapping means including means for tapping into said data and clock signals, means for delivering said tapped data and clock signals from said input connector to said tap connector, and means for separating said control signals from said data and clock signals for preventing tapping into said control signals.

9. The data tap as set forth in claim 8, said link including a plurality of data, clock and control link lines for transferring said data, clock and control signals, respectively.

10. The data tap as set forth in claim 9, said input connector including a plurality of data pins adapted for coupling with said data link lines, a plurality of clock pins adapted for coupling with said clock link lines, and a plurality of control pins adapted for coupling with said control link lines.

11. The data tap as set forth in claim 10, said output connector including a plurality of data pins coupled with said input connector data pins, a plurality of clock pins coupled with said input connector clock pins, and a plurality of control pins coupled with said input connector control pins.

12. The data tap as set forth in claim 11, said tap connector including a plurality of data pins coupled with said input connector data pins and a plurality of clock pins coupled with said input connector clock pins.

\* \* \* \* \*